Aug. 7, 1956    G. A. LYON    2,757,982
WHEEL COVER
Filed Oct. 30, 1952
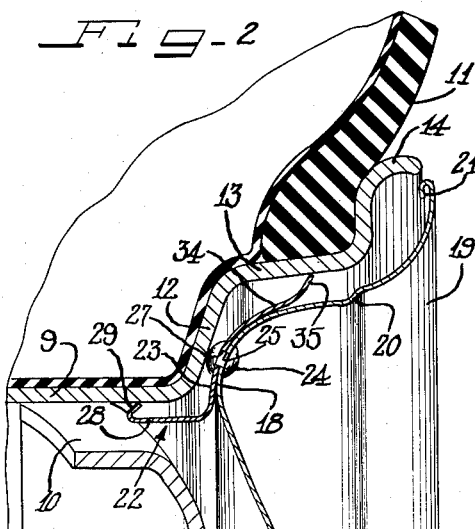
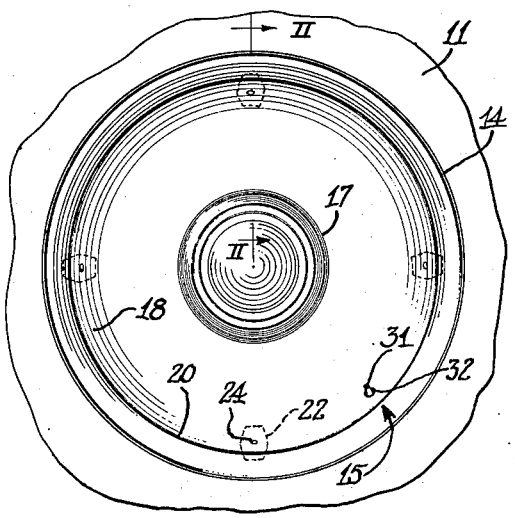
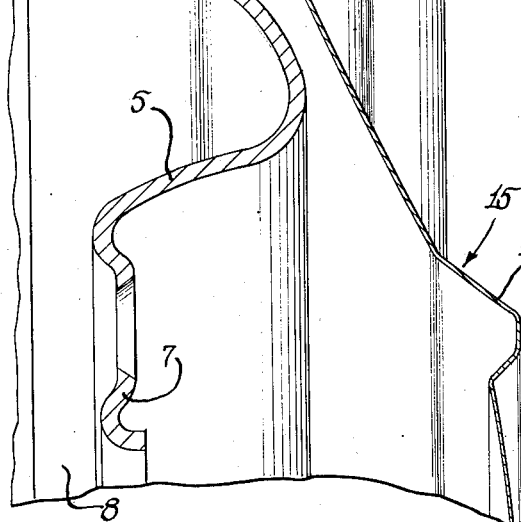
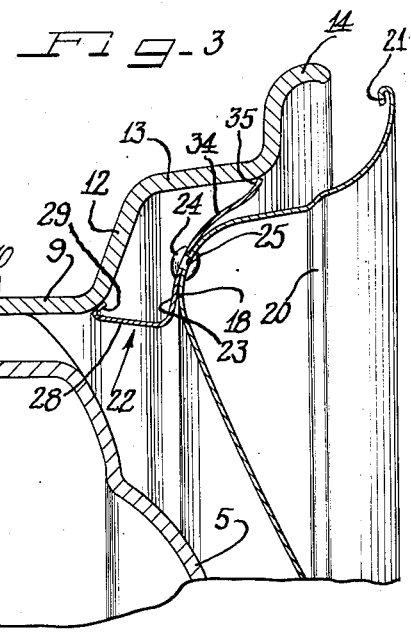
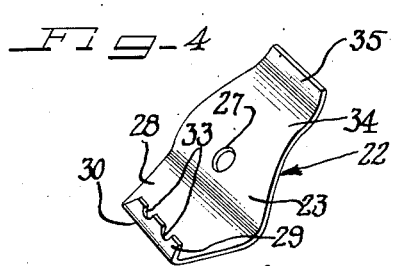
Inventor
George Albert Lyon
Attys

United States Patent Office 2,757,982
Patented Aug. 7, 1956

2,757,982

WHEEL COVER

George Albert Lyon, Detroit, Mich.

Application October 30, 1952, Serial No. 317,624

11 Claims. (Cl. 301—37)

The present invention relates to improvements in wheel structures and more particularly concerns the ornamental and protective covering of the outer sides of vehicle wheels such as automobile wheels.

An important object of the present invention is to provide an improved wheel structure having thereon a self-retaining protective and ornamental cover which is supported in self-centering, cushioned relation by means enabling the cover to be readily pressed into position and to be readily pried free from the wheel as desired.

A further object of the invention is to provide an improved wheel cover having thereon novel retaining means.

Still another object of the invention is to provide an improved wheel cover having double acting retaining finger structure.

Yet another object of the invention is to provide for a wheel cover novel retaining spring structure engageable with a plurality of flanges of a tire rim of a wheel to which an associated cover may be applied.

Other objects, features and advantages of the present invention will be readily apparent from the following detailed description of a preferred embodiment thereof taken in conjunction with the accompanying drawings in which:

Figure 1 is a side elevational view of a wheel structure embodying features of the present invention;

Figure 2 is an enlarged radial sectional view taken substantially on the line II—II of Figure 1;

Figure 3 is a radial sectional view similar to Figure 2 but showing the cover in the process of being applied to the wheel; and Figure 4 is a perspective view of one of the spring fingers utilized for retaining the cover on the wheel.

A vehicle wheel with which the present invention may be used may be of the disk spider type comprising a wheel body 5 having a central bolt-on flange 7 dished therein and provided at its outer margin with a generally axially inwardly extending peripheral attachment flange 8. The wheel spider or body 5 supports a tire rim preferably of the multi-flanged drop center type having a base flange 9 to which the attachment flange 8 of the wheel body is suitably secured. At appropriate intervals, such as four, the marginal attachment flange 8 of the wheel body is preferably inset to provide wheel openings 10 through which air may circulate in the operation of the wheel to facilitate cooling of a brake drum of a wheel axle structure to which the wheel may be attached through the bolt-on flange 7.

The tire rim is adapted to support a pneumatic tire and tube assembly 11. For this purpose, the tire rim includes a side flange 12 extending generally radially outwardly and sloping axially outwardly from the outer side of the base flange 9. From the radially outer margin of the side flange 12 extends an intermediate flange 13 which is directed generally axially outwardly but slopes slightly radially outwardly and merges with a radially outwardly extending portion of a terminal flange 14.

Applied to the outer side of the wheel is a cover 15 which is preferably of a self-retaining type. The cover as shown is of the full disk type which is preferably stamped or drawn from a sheet metal blank of suitable thin gauge and which may comprise stainless steel or brass, although other material may be used and provided with a desired finish such as plating and polishing or burnishing to a high luster or a combination of such finish with a painted finish all over or in certain areas, as preferred.

The cover 15 includes a central crown portion 17 which is adapted to overlie the central portion of the wheel body 5. From the crown portion, the cover body slopes preferably radially outwardly and axially inwardly to a preferably transversely dished or concave-convex annular intermediate portion 18 which is adapted to overlie the side flange 12 of the tire rim in assembly with the wheel. From the deepest part of the intermediate portion 18 of the cover, the outer marginal portion of the cover disk preferably extends generally axially outwardly and then radially outwardly more or less complementary to the outer side structure of the tire rim so as to be disposed in assembly with the wheel in spaced relation to the intermediate and terminal flanges of the tire rim. As shown, the outer margin of the cover is in the form of an outwardly convex annular rib 19 joined to the concave intermediate portion 18 of the cover by means of a rigidifying offsetting angular shoulder 20 preferably disposed approximately midway between the bottom of the groove defined by the intermediate portion 18 and the outer extremity of the marginal cover portion 19. At its outer extremity, the marginal portion 19 is provided with an underturned reinforcing and finishing bead-like flange 21 which is adapted in assembly with the wheel to lie in slightly spaced relation to the extremity edge of the terminal flange 14.

For retaining the cover 15 on the wheel, a series of retaining spring clip fingers 22 are provided which are adapted to be made as separate units from a suitable grade of spring steel and then attached to the cover. To this end, each of the spring fingers 22 comprises a body portion 23 (Figure 4) of substantial width and preferably bowed generally complementary to the inner convex side of the cover intermediate portion 18 to lie against the back of the cover intermediate portion in generally cradling or nested relation as best seen in Figures 2 and 3 and secured to the intermediate cover portion 18 as by means of a respective rivet 24 in each instance. To accommodate the rivet shank, the intermediate cover portion 18 is provided at suitable intervals with respective apertures 25 and with which are registerable coaxially corresponding respective apertures 27 in the body portions 23 of the spring fingers. By reason of the saddle-like structure of the spring finger body portions 23, substantial resistance is afforded to turning of the fingers on the cover should the attachment by means of the respective rivets be or become loose. Generally, however, the riveted attachment will be so firm that no turning would occur in any event.

In the present instance, four of the retaining finger structures 22 are provided, corresponding to the four wheel openings 10 in the wheel. Thereby respective spring retaining fingers 28 of the retaining finger structures 22 are adapted to engage retainingly with the radially inner side of the base flange 9 at the wheel openings. Each of the retaining finger portions 28 extends angularly from the adjacent portion of the finger member body 23, preferably generally axially inwardly relative to the cover and prior to application of the cover to the wheel preferably angling somewhat radially outwardly as visualized in Figure 3. Each of the retaining fingers 28 is of substantial length and width, preferably tapering from the full width of the finger body 23 to a narrower width at the distal terminal portion of the finger 28. Each of the fingers 28 is thereby of substantial resilience.

At the distal terminus of each of the fingers 28 is provided a short and stiff generally radially and axially outwardly acutely angled retaining terminal 29 joined to the finger 28 on a small radius juncture rib 30 which enhances the stiffness of the short retaining terminal 29. The relationship of the retaining finger members 22 to the cover is such that prior to application of the cover to the wheel, the tips of the retaining terminals 29 extend to a diameter which is slightly greater than the diameter of the inner face of the tire rim base flange 9. Hence, when the cover is applied to a wheel by first centering the cover with respect to a valve stem 31 adapted to project through a valve stem aperture 32 in the intermediate portion of the cover (Figure 1), and then pressing generally axially inwardly on the cover, the retaining finger terminals 29 will cam inwardly on the shoulder between the base flange 9 and the side flange 12 of the tire rim and then grippingly engage at their tips under strong resilient reaction from the retaining finger portions 28 and the contiguous part of the body 23 of the retaining finger members to retain the cover on the wheel. It would be observed on comparison of Figures 2 and 3 that the retaining fingers 28 are flexed radially inwardly as an incident to engagement of the terminals thereof with the tire rim base flange and that as an incident to such flexure, the body part of the finger structure adjacent thereto and which initially extends divergently relative to the adjacent convex surface of the cover backs up against the cover and thus progressively increases the tension of the finger structure reacting against the retaining tips of the terminals 29 of the fingers.

Each of the retaining finger terminals 29 is preferably notched as indicated at 33 to provide a plurality of corners on the retaining edge for resisting turning of the wheel cover due to torque stresses in service.

Additional retaining of the cover and also resistance to radial stresses in service tending to displace or vibrate the cover radially is afforded by providing each of the retaining finger structures 22 with a second tire rim engaging leg or finger 34 arranged to project generally radially and axially outwardly for engagement at its tip with the intermediate flange 13 of the tire rim. By preference, the finger extensions or legs 34 are preferably of generally ogee shape in longitudinal section and are of substantial width tapering from the body 23 of the finger structure. At their distal terminal portions, the finger legs 34 are provided with retaining terminals 35 which angle arcuately away from the adjacent portion of the cover in the space between the cover and the tire rim intermediate flange 13.

Before application of the cover to the wheel, it will be observed from Figure 3 that the clip legs 34 diverge throughout substantially their area from the opposing convex portion of the cover. Thereby, the tips of the terminals 35 extend to a diameter wherein they will initially contact against the shoulder at juncture of the intermediate flange with the terminal flange of the tire rim. Then, as the cover is pushed axially inwardly, the retaining tips of the terminals 35 cam along the inwardly sloping inner surface of the intermediate flange 13 and the finger legs 34 are progressively flexed radially inwardly and progressively back up against the cover. Hence, as the cover reaches its attached relation to the wheel, the finger legs 34 assume a maximum tension resilient retaining relation to the intermediate flange 13 reacting against the engagement tip of the terminals 35. Final engaged relation of the cover against the wheel may find the inner heads of the rivets 24 engaging the side flange 12 of the tire rim and thereby maintaining the intermediate portion 18 of the cover in spaced relation to the side flange. Thereby is provided a continuous gap between the cover and the tire rim so that air may circulate through such gap and the wheel openings 10.

For removing the cover from the wheel, a pry-off tool may be applied between the terminal flange 14 of the tire rim and the reinforced edge 21 of the cover and pry-off force levered against the cover axially outwardly for releasing the spring retaining fingers 22 from the tire rim. As the pry-off progresses, the pry-off tool can be inserted in a secondary stage of pry-off against the shoulder 20 provided spaced inwardly from the edge of the cover. Visual indication as to the location of the spring fingers 22 is afforded by the outer heads of the rivets 24 so that the pry-off force can be applied most effectively adjacent to one and then another of the retaining fingers.

It will be apparent that the retaining fingers 22 by their multi-retaining engagement with the flanges of the tire rim quite effectively hold the cover in place on the wheel against unintentional dislodgment both axially and torsionally. Furthermore, the cover is quite effectively held by the two legs of the clips against any appreciable radial vibration in service while nevertheless being resiliently yieldable for cushioning the cover against radially applied shocks or pressures.

It will be understood that modifications and variations may be effected without departing from the scope of the novel concepts of the present invention.

I claim as my invention:

1. In a wheel structure comprising a body and a tire rim, a cover for disposition at the outer side of the wheel having a plurality of circumferentially spaced retaining fingers of resilient sheet material thereon comprising retaining tips retainingly engageable with the tire rim at axially spaced points.

2. In a wheel structure including tire rim and body parts, a cover for the outer side of the wheel including retaining fingers of resilient sheet material retainingly engageable with one of said parts, and means securing said retaining fingers on the cover and engageable with said one part for maintaining a spaced relation of the cover with respect to said one part.

3. In a wheel structure including a multi-flanged tire rim having a base flange merging with a side flange which in turn merges with an intermediate flange, a cover for the outer side of the wheel comprising a cover member having at the back side thereof a series of retaining finger members each having retaining finger portions engageable with the base flange and other retaining finger portions engageable with the intermediate flange of the tire rim, and rivets securing said finger members to the wheel cover member and engageable with said side flange for maintaining the cover member in spaced relation thereto.

4. A cover for disposition at the outer side of a vehicle wheel having a multi-flanged tire rim, comprising an annular inwardly convex cover portion adapted to lie adjacent the tire rim and having therebehind a plurality of finger members including saddle-like body portions secured to the back of said intermediate convex cover portion and generally oppositely directed retaining leg portions engageable with flanges of the tire rim.

5. A cover for disposition at the outer side of a vehicle wheel having a multi-flanged tire rim, comprising an annular inwardly convex cover portion adapted to lie adjacent the tire rim and having therebehind a plurality of finger members including saddle-like body portions and generally oppositely directed retaining leg portions engageable with flanges of the tire rim, said body portions normally lying in diverging relation to the adjacent surfaces of the cover and being flexibly movable into backed up relation to the cover as an incident to flexing of the leg portions.

6. In a cover for disposition at the outer side of a vehicle wheel, a cover body, a series of elongated retaining finger members, and rivets securing said retaining finger members intermediately thereof to the back of said cover member with opposite leg portions of the finger members being disposed for retaining engagement with flanges of a wheel to which the cover may be applied.

7. In a cover for disposition at the outer side of a vehicle wheel, a cover body having on an annular area therebehind a series of retaining finger members each of which is intermediately secured to the cover member and has a retaining finger extending generally axially inwardly and provided with a generally radially and axially outwardly extending short and stiff wheel flange engaging terminal, and a second leg which extends generally radially outwardly and has a tip engageable with another flange of a wheel, both of the legs being resiliently flexible toward and away from the cover.

8. In a retaining finger structure for retaining a wheel cover on a wheel, an elongated spring plate of substantial width having a portion intermediate its length adapted to be secured to a wheel cover and having one end portion angled from said intermediate portion and providing a retaining leg, said retaining leg having a short and stiff retaining terminal angular thereto and providing a wheel engaging extremity, and the opposite end portion of the retaining finger plate extending on a curvature to provide a short but resilient terminal having a wheel engaging edge.

9. A retaining finger member for use with a wheel cover, said member comprising a generally concave convex body having extending angularly from one end thereof an elongated flexible retaining leg and having extending on an ogee curvature from the other end thereof a second retaining leg having an edge engageable with a wheel, said angular leg having a short and stiff terminal angled therefrom and having its edge extending in the same general direction as the ogee leg, one of said edges being notched to provide a plurality of gripping corners in addition to opposite side corners on such edge.

10. In a wheel structure including a tire rim having a generally radially inwardly facing and axially extending annular intermediate flange extending from a generally axially outwardly facing and radially inwardly directed side flange, a cover disposed at the outer side of the wheel including an annular portion overlying the tire rim and having a generally axially inwardly and radially inwardly directed circular dished intermediate part for opposed respectively generally axially inwardly facing and generally radially outwardly facing spaced disposition opposite the side and intermediate flanges of the tire rim, and retaining spring clips carried by axially inwardly facing portion of said circular cover part and each provided with a resilient leg extending generally axially outwardly and being radially deflectable in the space between the cover part and said intermediate flange and having at its axially outer extremity a generally radially outwardly angled terminal having an edge terminus retainingly engageable in gripping retaining relation against the intermediate flange in press-on pry-off relation with the leg radially inwardly tensioned towards said cover part.

11. In a wheel structure including a tire rim having a generally radially inwardly facing and axially extending annular intermediate flange extending from a generally axially outwardly facing and radially inwardly directed side flange, a cover disposed at the outer side of the wheel including an annular portion overlying the tire rim and having a generally axially inwardly and radially inwardly directed circular part for spaced disposition opposite the side and intermediate flanges of the tire rim, and retaining spring clips carried by said circular cover part and provided with a resilient leg extending generally axially outwardly and being radially deflectable in the space between the cover part and said intermediate flange and having at its axially outer extremity a generally radially outwardly angled terminal having an edge terminus retainingly engageable in gripping retaining relation against the intermediate flange in press-on pry-off relation with the leg radially inwardly tensioned towards said cover part, said clips being secured to said cover part by means of rivets extending therethrough and the cover part and having the inner end portions thereof projecting axially inwardly beyond the clips and engaged as axially inward position determining stops against said side flange of the tire rim.

References Cited in the file of this patent

UNITED STATES PATENTS

| | | |
|---|---|---|
| 2,113,541 | Blank | Apr. 5, 1938 |
| 2,202,102 | Horn | May 28, 1940 |
| 2,368,228 | Lyon | Jan. 30, 1945 |
| 2,607,632 | Lyon | Aug. 19, 1952 |
| 2,624,636 | Lyon | Jan. 6, 1953 |
| 2,629,635 | Lyon | Feb. 24, 1953 |
| 2,689,770 | Pipes | Sept. 21, 1954 |